United States Patent [19]

Baker

[11] Patent Number: 4,792,212

[45] Date of Patent: * Dec. 20, 1988

[54] LIQUID CRYSTAL SWITCHING DEVICE

[75] Inventor: Anthony P. Baker, New York, N.Y.

[73] Assignee: ITT Defense Communications, A Division Of ITT Corporation, Nutley, N.J.

[*] Notice: The portion of the term of this patent subsequent to Nov. 15, 2005 has been disclaimed.

[21] Appl. No.: 913,808

[22] Filed: Sep. 30, 1986

[51] Int. Cl.[4] ............................................. G02F 1/133
[52] U.S. Cl. .............................. 350/347 V; 350/395; 350/401
[58] Field of Search .............. 350/96.13, 96.14, 347 E, 350/347 R, 347 V, 381, 395, 401

[56] References Cited

U.S. PATENT DOCUMENTS 4,278,327 7/1981 McMahon et al. ............. 350/347 V
4,478,484 10/1984 Soref ................................ 350/347 E

OTHER PUBLICATIONS

Scheffer, "Cholesteric Layer As Passive Display Element", in Kmetz et al (Ed.), Nonemissive Electrooptic Displays, Plenum Press, New York (1976), pp. 75–77, (TK 7882.I6.B67).

Primary Examiner—John K. Corbin
Assistant Examiner—Martin Lerner
Attorney, Agent, or Firm—Robert A. Walsh; Thomas N. Twomey; Mary C. Werner

[57] ABSTRACT

A liquid crystal switching device includes first and second polarization reorienting cells disposed such that a polarized component of an incident light beam is incident normal to the cell.

14 Claims, 3 Drawing Sheets

LIQUID CRYSTAL SWITCHING DEVICE

BACKGROUND OF THE INVENTION

The present invention generally relates to a liquid crystal switching device and, in particular, relates to one such device having means, disposed substantially perpendicular to the path of polarized components of a split incident light beam, for controllably reorienting the polarization thereof.

The use of optical fibers, particularly as a telecommunication transmission medium, has numerous advantages over existing telecommunication media. For example, optical fibers can sustain a broader bandwidth signal and hence, can convey larger quantities of information over the same period of time than existing media. Further, light waves used in optical fibers have even shorter wavelengths than the conventional microwaves commonly used in telecommunication systems. Thus, a reduction in the physical size of components is readily achievable. This size reduction further can result in an overall cost reduction for materials, packaging and manufacturing. Still further, optical fibers exhibit little or no electromagnetic or radio frequency radiation thus resulting in a negligible environmental impact. Conversely, optical fibers are relatively insensitive to electromagnetic and radio frequency interference from the surrounding environment.

To be viable, every telecommunication system must include some means for controllably redirecting a signal, or at least a portion thereof, to or from a transmission medium or between one, or more, such media. In the case of an optical telecommunication system the redirecting means is an optical switch. Currently, optical switches are generally mechanical in nature.

However, mechanical switches require relatively high driving power and are subject to wear, abrasion and fatigue. As a result, mechanical switches are prone to failure after repeated use. In addition, since a rather small optical fiber is usually displaced from alignment with one port fiber into alignment with another port fiber, mechanical switches can easily become expensive. One particular reason for this expense is the very small tolerances required to ensure the proper alignment between the optical fibers moved and the optical fibers associated with the ports.

Recently, liquid crystal optical switching devices have been proposed as an alternative to mechanical switches. Typical of such liquid crystal optical switches are those described in U.S. Pat. No. 4,201,422 issued to McMahon et al. on May 6, 1980; U.S. Pat. No. 4,278,327 issued to McMahon et al. on July 14, 1981 and U.S. Pat. No. 4,385,799 issued to Soref on May 31, 1983. Therein a plurality of liquid crystal optical switch designs are described wherein optical fibers are attached to the side angled surfaces of a pair of opposing trapezoidal prisms. The trapezoidal prisms are arranged with the bases thereof parallel and with liquid crystal material disposed therebetween.

Although the optical switches described in the above referenced U.S. patents have some advantages over conventional mechanical optical switches, one advantage being no moving parts, these liquid crystal switches are both difficult and expensive to manufacture since all the surfaces of the trapezoidal prism must be ground, lapped and polished to be optically flat and fixed at a precise angular relation to each other. As a result, the liquid crystal optical switches described in the above referenced patents are currently impractical for optical communication systems.

More recently, liquid crystal optical switching devices have been developed that are less expensive and considerably more amenable to mass production techniques. Typical of these are the devices described and discussed in U.S. patent application Ser. Nos. 795,157 and 795,154 both filed on Nov. 5, 1985 and assigned to the assignee hereof. These applications are incorporated herein by reference. The switching devices discussed therein generally include polarization changing cells that are provided with an alignment layer that tilts the molecules on the inner surfaces thereof. The tilted molecular alignment layer orients the surface molecules of the liquid crystal material. Such an alignment layer is used to ensure that the molecules of the surface layers of the liquid crystal material are disposed, i.e. tilted, so that a light beam incident thereon impinges normal to a homogeneously aligned liquid crystal material. Such a molecular alignment layer can, however, frequently be difficult to fabricate without impurities at the precise desired angle for effecting the reorientation of the polarization of a light beam traversing that cell. Even when such a layer is provided with negligible impurities, the possibility remains for impurities within the liquid crystal material, per se, to cause perturbations in the reorienting of the polarization of the light beam impinging thereon.

Consequently, a liquid crystal switching device that eliminates the need for a molecular alignment layer for molecular tilting is highly desireable in order to improve the viability of such switching devices.

SUMMARY OF THE INVENTION

Accordingly, it is one object of the present invention to provide a liquid crystal switching device that substantially completely eliminates the need for a molecular alignment layer.

This object is accomplished, at least in part, by a liquid crystal switching device including means, disposed perpendicular to an incident light beam thereon, for reorienting the polarization of at least one frequency component of that incident light beam.

Other objects and advantages of the present invention will become apparent to those skilled in the art from the following detailed description read in conjunction with the appended claims and drawing attached hereto.

DETAILED DESCRIPTION OF THE INVENTION

Figure 1:
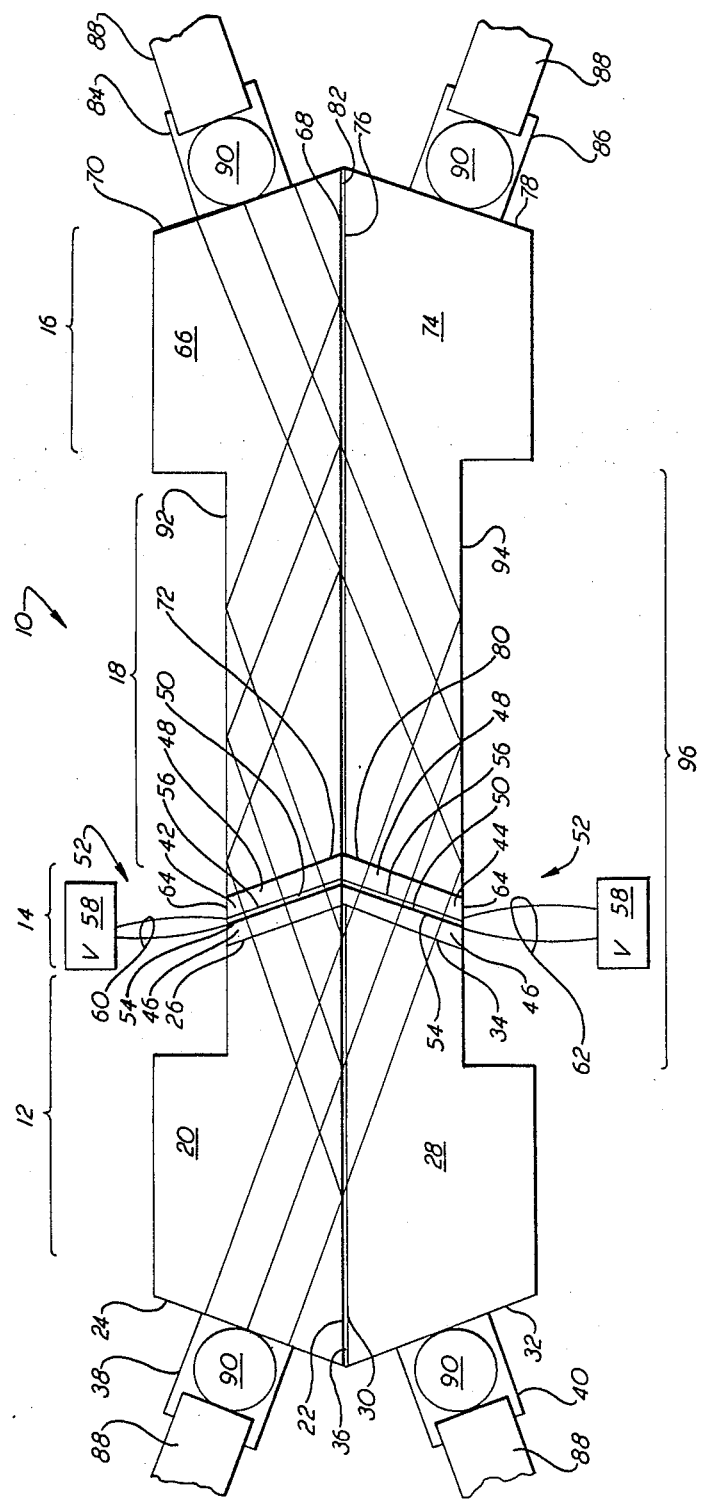
FIG. 1 is a pictorial view, not drawn to scale, of a liquid crystal switching device embodying the principles of the present invention.

A liquid crystal switching device, generally indicated at 10 in the Figures and embodying the principles of the present invention, includes means 12 for splitting an incident light beam into first and second polarized components, means 14, disposed normal to the path of the first and second polarized components, for controllably reorienting the polarization thereof and means 16 for recombining the first and second polarized components. Preferably, the liquid crystal switching device 10 further includes means 18 for redirecting the polarized components toward the polarized component recombining means 16.

In one preferred embodiment, the means 12 for splitting an incident light beam includes a first transparent member 20 having a first planar surface 22 and first and second end surfaces, 24 and 26, respectively, and a second transparent member 28 having a first planar surface 30 and first and second end surfaces, 32 and 34, respectively. The first and second transparent members, 20 and 28, respectively, are disposed such that the planar surfaces, 22 and 30, respectively, thereof are spaced apart from each other by a layer 36 of liquid crystal material. Further, the end surfaces, 24 and 26, of the first transparent member 20 and the end surfaces, 32 and 34, of the second transparent member 28 preferably extend from respective ends of the planar surface such that an included angle is formed between each end surface, 24, 26, 32 and 34, and the respective planar surface, 22 or 30. As more fully discussed below, all of the included angles are at least equal to or, preferably, greater than the critical angle.

As generally known in the field of optics, the critical angle is that minimum angle at which a light beam, incident upon an interface having different indices of refraction on the sides thereof, is totally reflected. The critical angle is generally defined by the formula:

$$\sin \theta_c = n'/n \text{ wherein:}$$

$\theta_c$ is the incident angle of the light beam measured from the normal to the interface; n' is the index of refraction of the material whereupon the light beam is incident; and n is the index of refraction of the material wherein the light beam is traveling prior to impinging upon the interface.

Preferably, each of the first end surfaces, 24 and 32, respectively, has an optical fiber port, 38 and 40, respectively, associated therewith. The ports, 38 and 40, are adapted to bidirectionally convey collimated light beams to and/or from the first and second transparent members, 20 and 28, respectively; and hence the liquid crystal switching device 10.

The above-described means 12 for splitting an incident light beam, when the molecules of the layer 36 of liquid crystal material are homeotropically aligned with respect to the first planar surfaces, 22 and 30, of the transparent members, 20 and 28, effectively divides an incident light beam into the plane, i.e. the $T_E$ and $T_M$, polarized components thereof when the incident light beam is incident at an angle at least equal to the critical angle. This phenomena is more fully described and discussed in U.S. patent application Ser. No. 795,150 filed on Nov. 5, 1985, and assigned to the assignee hereof. This application is deemed incorporated herein by reference. In essence, this phenomena occurs because the layer 36 of liquid crystal material is birefringent, that is it exhibits a different index of refraction for each of the plane polarized components of the incident light beam. Hence, when the incident light beam impinges upon the liquid crystal interface only that plane polarized component impinging at the critical angle is totally reflected. The other plane polarized component, being incident at an angle that is less than the critical angle thereof due to the birefringence, is thus transmitted across the layer 36.

The end surfaces, 24, 26, 32 and 34, of the first and second transparent members, 20 and 28, respectively, by being disposed at an included angle that is at least equal to the critical angle, ensure that the polarized components of a split incident light beam entering the device 10 via the first end surfaces, 24 and 32, impinge normal to the second end surfaces, 26 and 34. This geometric relation is ensured by an appropriate choice of the length of the first planar surfaces, 22 and 30. The lengths of the first end surfaces, 24 and 32, the second end surfaces, 26 and 34 and the planar surfaces, 22 and 30, are interrelated by known geometric and optical consideration.

The means 14 for reorienting the polarized components of the split incident light beam includes, in the preferred embodiment, first and second polarization reorienting cells, 42 and 44, respectively. Each polarization reorienting cell, 42 and 44, includes, in one embodiment, first and second transparent slides, 46 and 48, respectively, having a liquid crystal material 50 disposed therebetween. Each cell, 42 and 44, further includes a means 52 for providing an electromagnetic field within the liquid crystal material 50.

In one embodiment, the electromagnetic field providing means 52 includes at least one first electrode 54 proximate the first transparent slide 46 and at least one second electrode 56 proximate the second transparent slide 48. The electrodes, 54 and 56, are preferably connected to a means 58 for controllably providing a voltage to the electrodes, 54 and 56. Such a controllable voltage providing means 58 is well known in the art and, in fact, almost any switchable power supply can be utilized. Preferably, the power supply is connected to the electrodes, 54 and 56, of the cells, 42 and 44, by pairs of leads, 60 and 62, respectively, that are attached to the electrodes. 54 and 56, respectively, at an edge 64 of the cells, 42 and 44; by, for example, means of an electrically conductive epoxy.

As more fully discussed hereinafter, in regard to the operation of the liquid crystal switching device 10 wherein the molecules of the liquid crystal material 50 are homeotropically aligned with respect to the slides, 46 and 48, when a voltage is applied to the electrodes, 54 and 56, of a cell, 42 or 44, the polarization of the polarized component of the light beam incident normally thereon is reoriented. For example, a $T_M$ polarized light beam component exits the reorienting means, 14 as a $T_E$ and vice versa. However, in the quiescent state, i.e. without the appropriate voltage applied, the polarized components of the light beam normally incident thereon traverse the cell, 42 or 44, without reorientation of the polarization thereof.

The means 16 for recombining the polarized components of the incident light beam, in this embodiment, includes a first transparent member 66 having a first planar surface 68 and first and second end surfaces, 70 and 72, respectively, a second transparent member 74 having a first planar surface 76 and first and second end surfaces, 78 and 80, respectively. Preferably, the first and second end surfaces, 70, 72, 78 and 80, of each transparent member, 66 and 74, respectively, are parallel to each other and the first end surfaces, 70 and 78, respectively, distal the polarization reorienting means 14 intersect the first planar surfaces, 68 and 76, respectively, at an included angle at least equal to, but preferably greater than, the critical angle. The polarization component recombination means 16 further includes a layer 82 of liquid crystal material disposed between the first planar surfaces, 68 and 76, of the first and second transparent members, 66 and 74, thereof. Furthermore, each of the end surfaces, 70 and 78, distal the polarization reorienting cells, 42 and 44, respectively, has an optical fiber port, 84 and 86, respectively, associated therewith for bidirectionally conveying light beams thereacross, and hence the liquid crystal switching device 10.

The liquid crystal switching device 10 interfaces with optical fibers 88 via the ports, 38, 40, 84 and 86, thereof. In general, each port, 38, 40, 84 and 86, includes a collimating lens 90 that, in the embodiment shown, abuts the end surfaces, 24, 32, 70 and 78, respectively, and with the optical fiber 88. Alternatively, the optical fiber 88 can be affixed proximate the first planar surfaces, 22, 30, 68 and 76, by, for example, the provision of a blind hole that is formed substantially perpendicular to each first end surface, 24, 32, 70 and 78, respectively. The associated collimating lens 90 would then be positioned at the bottom of each blind hole. Such a structure is more fully described and discussed in U.S. patent application Ser. No. 795,156 filed on Nov. 5, 1985 and assigned to the assignee hereof. This application is deemed incorporated herein by reference.

In the preferred embodiment, the means 18 for redirecting the light beam components to the recombination means 16 is defined by providing each of the first and second transparent members, 66 and 74, respectively, of the component recombination means 16 with a second planar surface, 92 and 94, respectively, parallel with, and spaced apart from, the first planar surfaces, 68 and 76, respectively. The second planar surfaces, 92 and 94, typically, although not necessarily, terminate at the first and second polarization reorienting cells, 42 and 44, respectively, and are of a length and flatness that ensures the total internal reflection of light beams exiting the polarization reorienting cells, 42 and 44. In the preferred embodiment, as more fully discussed below, to reduce the overall size of a liquid crystal switching device 10, the second planar surfaces, 92 and 94, define a comparatively narrower segment 96 over the extent thereof. Such a comparatively narrower segment 96 effectively reduces the distance the polarized components of the light beam travel, thus allowing for a liquid crystal switching device 10 that is considerably smaller than prior art devices.

In operation, an incident light beam is provided via an optical fiber 88 at, for example, the port 38 associated with the first end surface 24. The incident light beam is split into the plane polarization components thereof upon impinging on the homeotropically aligned layer 36 of liquid crystal material/first transparent member 20 interface. The polarized components are then directed, by conventional optical geometries normal to the polarization cells, 42 and 44. Depending on the voltage applied thereto, the polarization of the component passing through each cell, 42 and 44, is either reoriented by, effectively, a 90 degree phase change, or remains unchanged. The polarized components exiting the polarization cells, 42 and 44, in the preferred embodiment, are then totally reflected upon incidence at the air-/second planar surface, 92 and 94, interfaces and thus redirected to the polarized component recombination means 16. The recombined polarization components are, again depending upon the voltages applied to the electrodes, 54 and 56, of the polarization cells, 42 and 44, directed to one of the ports, 84 and 86, associated with the polarized component recombining means 16.

Typically, a voltage on the order of about 5–10 volts is applied to the electrodes, 54 and 56, to effect the polarization reorientation. In one operational embodiment, when the liquid crystal molecules are in the quiescent state (i.e. no voltage applied to the electrodes) the molecules of the liquid crystal material are rotated 90° with respect to each other across the light path through the cell, 42 or 44. This condition is commonly referred to as a twisted liquid crystal. When voltage is applied the molecules are not so rotated. The operation of such a twisted liquid crystal cell is fully described and discussed in U.S. patent application Ser. No. 759,157 filed on Nov. 5, 1985, and assigned to the assignee hereof. This application is incorporated herein by reference.

Alternatively, the liquid crystal switching device 10 can be used as a wave division device by employing polarization reorientation cells, 42 and 44, in what may commonly be referred to as a "Pi cell" configuration. The operational principles of such a cell configuration are fully described and discussed in U.S. Patent application Ser. No. 795,154 filed on Nov. 5, 1985 and assigned to the assignee hereof. This application is incorporated herein by reference. Essentially, the name Pi cell derives from the fact that the frequency of the component reoriented is related to the length of the path traveled, that is the cell thickness when the component is incident normal thereto, by a multiple of $\pi$. As discussed therein, a Pi cell can be operated to selectively reorient the polarization of a particular frequency, and a rather narrow bandwidth, of light beam without disturbing the polarization of the remainder of the light beam. In such operation, a voltage on the order of about 5 volts is usually sufficient to effect the polarization reorientation in a Pi cell.

Advantageously, because the polarization reorientation cells, 42 and 44, are disposed perpendicular, or normal, to the polarized components of a split incident light beams many stringent requirements are removed from the fabrication thereof. One particularly advantageous structure of a polarization reorientation cell, 42 or 44, is more fully described and discussed in U.S. patent application Ser. No. 913,796 entitled LIQUID CRYSTAL CELL filed on even date herewith. This referenced application is assigned to the assignee hereof and incorporated herein by reference. Based on such a cell design, the glass slides, 46 and 48, can be eliminated and the electrodes, 54 and 56, can be formed directly upon the second surfaces, 26, 34, 72 and 80. Further, as discussed in the immediately above-referenced patent application, less than the full switching voltage can be applied to the electrodes, at least with respect to the Pi cell, to tune the polarization reorientation cells, 42 and 44. Clearly, the means 14 can be made as a single cell, i.e. with only two electrodes instead of two cells, 42 and 44, and two electrodes, 54 and 56, each. However, two such cells, 42 and 44, are preferred so that the individual polarization components can be independently adjusted.

The liquid crystal switching device 10 can be fabricated from inexpensive plastic materials using known plastic molding and machining techniques. In one particular embodiment, the liquid crystal switching device 10 can be formed having an overall length on the order of about 25 millimeters, a central width of about 5 millimeters and an overall depth on the order of about 8 millimeters. The particular cross-sectional shape of the device 10 can be rectangular, although this is not considered limiting in any manner as square, circular or any other cross-sectional shape can also be used. Preferably, the liquid crystal material of the layers, 36, 50 and 82, is nematic although other types can also be used. The physical positioning of the polarization reorienting cells, 42 and 44, along the length of the device 10 can be readily ascertained using known optical design parameters.

One particular advantage of such a liquid crystal switching device 10 is that a plurality of such devices 10 can be readily configured to interface with each other without introducing any disruption of the total internal reflection surface that defines the redirecting means 18. That is, the presence of the comparatively narrower segment 96 ensures that, especially for the maintenance of the desired total internal reflection use as the redirecting means 18, the second planar surfaces, 92 and 94, will consistently form an interface with the ambient air. This is in contrast to other known configurations that, when stacked, abut another solid material and thus require the use of complex index of refraction matching techniques to ensure uniformity throughout the resultant stacked device.

Figure 2:
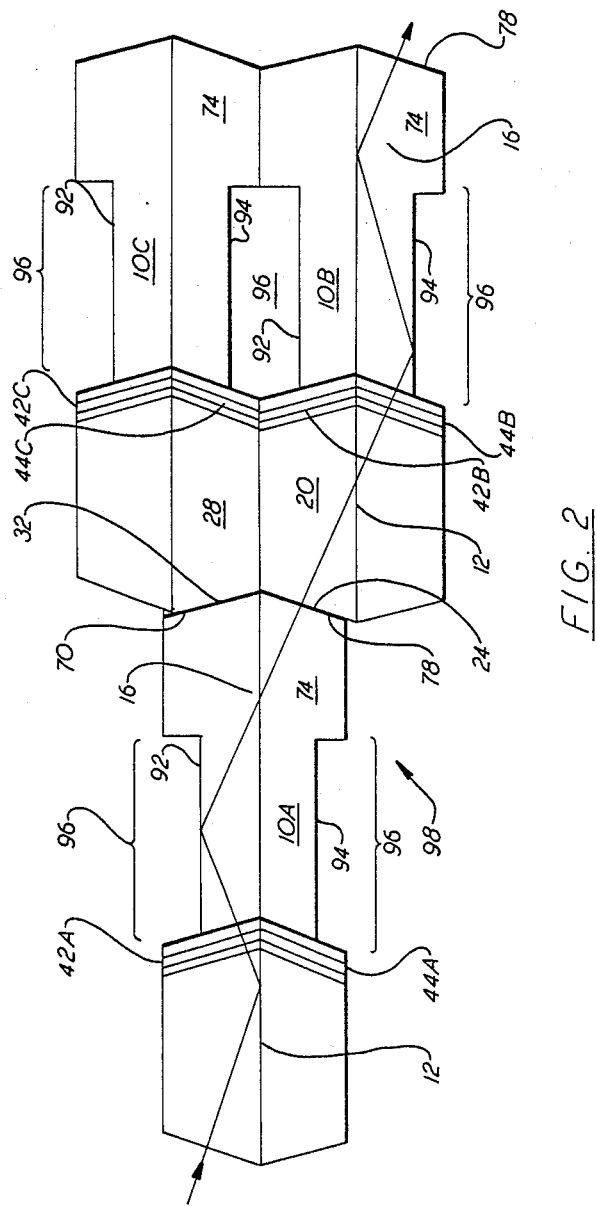
FIG. 2 is a pictorial view, not drawn to scale, of a plurality of interconnected liquid crystal switching devices, each embodying the principles of the present invention.

A multiple liquid crystal switching device assembly is generally indicated at 98 in FIG. 2 and embodies the principles of the present invention. For the convenience of the reader, previously used indicia are repeated for previously discussed elements. The assembly 98 includes first, second and third liquid crystal switching devices, 10A, 10B, and 10C, respectively. The first end surfaces, 70 and 78, of the first device 10A abut the first end surface 24 of the first transparent member 20 and the first end surface 32 of the second transparent member 28 of the second and third devices, 10B and 10C, respectively. In one fabrication technique the abutting ends are secured to each others by means of an index of refraction matching adhesive, such as for example, an epoxy. The benefit of the comparatively narrower segments 96 is readily apparent from FIG. 2 wherein the second planar surfaces, 92 and 94, that are proximate each other of the second and third devices, 10B and 10C, respectively, remain spaced apart by the ambient air to ensure the total internal reflection within each device.

The operation of the assembly 98 is shown via a typical single polarized ray diagram provided in FIG. 2. Therein an incident light beam composed of a single plane polarized component is reflected from the first beam splitting means 12 and traverses the first polarization reorienting cell 42 of the first device 10A. For this discussion the polarization of the component is considered as being changed during traversal of the cell 42. Upon reflection at the air/second planar surface interface, the light beam now traverses the polarized component recombination means 16 of the first device 10A as well as the beam splitting means 12 of the second device 10B. Thereafter, the light beam is incident on the second polarization reorientation cell 44 of the second device 10B and, for the sake of this description, is considered to have the polarization thereof reoriented thereby. Hence, the light beam is totally reflected internal to the second liquid crystal switching device 10B toward the recombination means 16 thereof whereupon, due to the change in polarization, the light beam is totally reflected and exits the second liquid crystal switching device 10B via the first end surface 78 of the second transparent member 74 of the recombination means 16 thereof. Based on the above it will become apparent that by judiciously controlling the voltage on the various cells, 42A, B and C and 44A, B and C any polarized component, regardless of the initial polarization thereof, can be directed to any of the end surfaces, 70 and 78, associated with the means 16 of the second and third devices, 10B and 10C. Hence, from these considerations a switching matrix utilizing such liquid crystal switching devices 10 can readily be formed.

Figure 3:
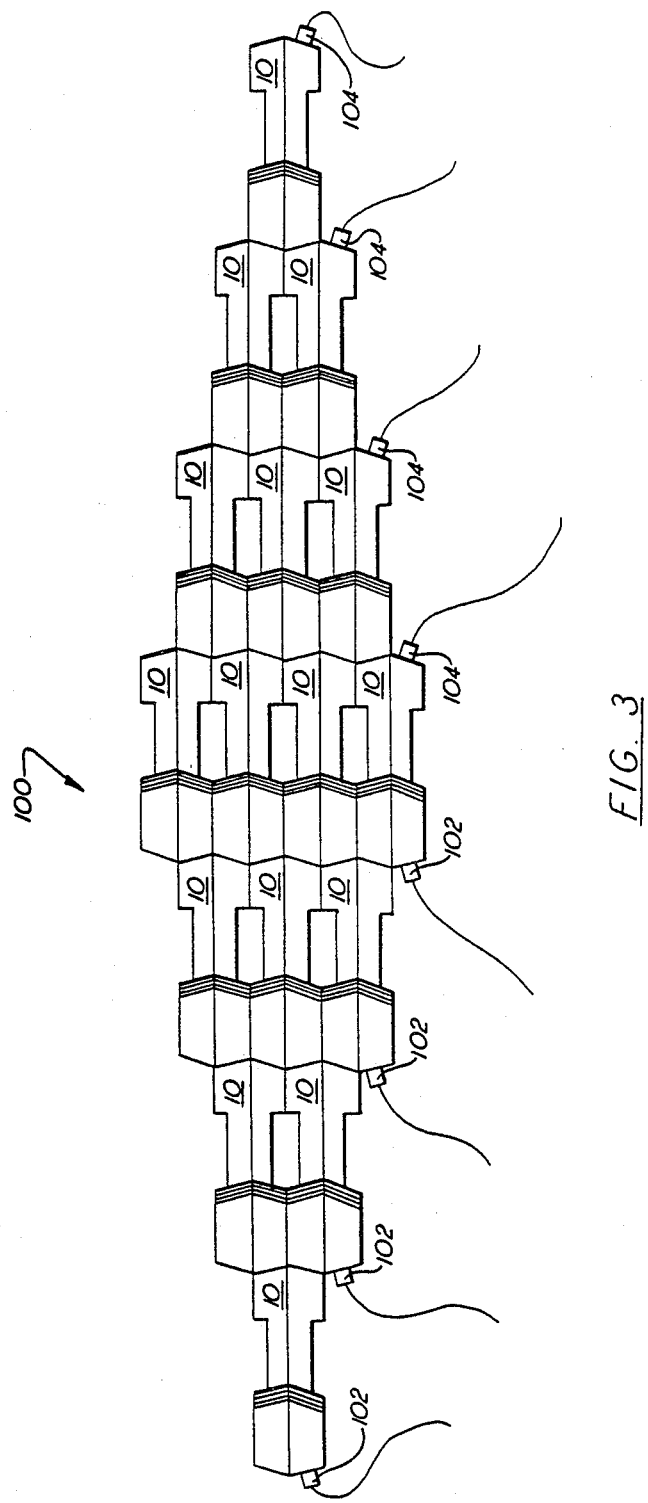
FIG. 3 is a switching matrix, not drawn to scale, employing a plurality of liquid crystal cells, each embodying the principles of the present invention.

An exemplary 4×4 switching matrix 100 employing 16 liquid crystal switching devices 10 is shown in FIG. 3. Therein, the matrix 100 is formed by stacking the devices 10 in a fashion similar to that shown in FIG. 2. For the present discussion, the matrix 100 is considered to include four input/output ports 102 and four output/input ports 104. Any one of the input/output ports 102, by applying appropriate voltages on the associated electrodes, can effectively be made to intercommunicate with any of the four output/input ports 104. The entire matrix 100 shown in FIG. 3 can be mass produced by injection molding techniques in conjunction with well known thin film technology and laser machining techniques.

The present liquid crystal switching device 10 is advantageous in that it not only eliminates the stringent requirements previously necessary to form molecular alignment layers within the polarization reorienting cells, but is also advantageous in that the stackability thereof is enhanced by the provision of a comparatively narrower segment that not only ensures total internal reflection but can provide a reduction in the the overall length of the device 10.

Although the present invention has been described with respect to particular embodiments, other arrangements and configurations may also be developed that, nevertheless, do not depart from the spirit and scope of the present invention. Hence, the present invention is deemed limited only by the appended claims and the reasonable interpretation thereof.

I claim:

1. A liquid crystal switching device; said device comprises:
   means for splitting an incident light beam into first and second polarized components;
   means, disposed normal to the path of said polarized components, for controllably reorienting the polarization of said polarized components;
   means, disposed in said path of said polarized components, for recombining said polarized components whereby said polarized components can be selectively directed to one of two different output ports;
   means for redirecting said polarized components toward said polarized component recombining means; and
   a comparatively narrower segment and a comparatively wider segment, said redirecting means being disposed along said comparatively narrower segment.

2. Device as claimed in claim 4, wherein said redirecting means is defined by at least one ambient/transparent member interface.

3. A liquid crystal switching device; said device comprises:
   means for splitting an incident light beam into first and second polarized components;
   means, disposed normal to the path of said polarized components, for controllably reorienting the polarization of said polarized components;

means, disposed in said path of said polarized components, for recombining said polarized components whereby said polarized components can be selectively directed to one of two different output ports wherein said incident light beam splitter means includes:
a first transparent member having a first planar surface and first and second end surfaces, said end surfaces being disposed, with respect to said first planar surface, at substantially equal included angles therewith; and
a second transparent member having a first planar surface and first and second end surfaces, said end surfaces being disposed, with respect to said first planar surface of said second transparent member at substantially equal included angles therewith, said first planar surface of said second transparent member opposing said first planar surface of said first transparent member and being spaced apart therefrom by a first layer of liquid crystal material.

4. Device as claimed in claim 3 wherein said beam recombining means includes a third transparent member having a first planar surface and first and second end surfaces, said end surfaces being substantially parallel; and
a fourth transparent member having a first planar surface and first and second end surfaces, said end surfaces being substantially parallel, said first planar surface of said third transparent member opposing said first planar surface said fourth transparent member and being spaced apart therefrom by a second layer of liquid crystal material.

5. Device as claimed in claim 4, wherein said polarization reorientation means is disposed between said second surfaces of said transparent members.

6. Device as claimed in claim 5, wherein said polarization reorientation means includes first and second transparent slides having liquid crystal material disposed therebetween, said first and second transparent slides being disposed between said second surfaces of said transparent members.

7. Device as claimed in claim 5, wherein said polarization reorientation means includes first and second polarization reorientation cells, said first polarization reorientation cell being disposed between said second surfaces of said first and third transparent members and said second polarization reorientation cell being disposed between said second surfaces of said second and fourth transparent members.

8. Device as claimed in claim 7, wherein each said polarization reorientation cell includes means for establishing an electromagnetic field across said liquid crystal material.

9. Device as claimed in claim 8, wherein said electromagnetic field establishing means includes first and second electrodes connected to a controllable source of electric potential.

10. A liquid crystal switching device; said device comprises:
means for splitting an incident light beam into first and second polarized components;
means, disposed normal to the path of said polarized components, for controllably reorienting the polarization of said polarized components;
means, disposed in said path of said polarized components, for recombining said polarized components whereby said polarized components can be selectively directed to one of two different output ports;
means, associated with said incident light beam splitting means, for bidirectionally conveying a light signal thereto; and
means associated with said polarized component recombining means for bidirectionally conveying a light signal associated therewith.

11. A liquid crystal switching matrix; said matrix comprises:
a plurality of liquid crystal switching devices, each said device having a means for splitting an incident light beam into first and second polarized components, means, disposed normal to the path of said polarized components, for controllably reorienting the polarization of said polarized components, and, means for recombining said polarized components whereby said polarized components can selectively be directed from one of said devices to one of two devices proximate thereto wherein each said incident light beam splitter of each device includes:
a first transparent member having a first planar surface and first and second end surfaces, said end surfaces being disposed with respect to said first planar surface at substantially equal included angles therewith; and
a second transparent member having a first planar surface and first and second end surfaces, said end surfaces being disposed, with respect to said first planar surface of said second transparent member at substantially equal included angles therewith, said first planar surface of said second transparent member opposing said first planar surface of said first transparent member and being spaced apart therefrom by a first layer of liquid crystal material.

12. Matrix as claimed in claim 11 wherein each said beam recombining means includes a third transparent member having a first planar surface and first and second end surfaces, said end surfaces being substantially parallel; and
a fourth transparent member having a first planar surface and first and second end surfaces, said end surfaces being substantially parallel, said first planar surface of said third transparent member opposing said first planar surface said fourth transparent member and being spaced apart therefrom by a second layer of liquid crystal material.

13. Matrix as claimed in claim 12 wherein each said polarization reorientation means is disposed between said second surfaces of said transparent members.

14. Matrix as claimed in claim 13 wherein each said polarization reorientation means includes first and second polarization reorientation cells, said first polarization reorientation cell being disposed between said second surfaces of said first and third transparent members and said second polarization reorientation cell being disposed between said second surfaces of said second and fourth transparent members.

* * * * *